(12) United States Patent
Ryu et al.

(10) Patent No.: US 9,779,464 B2
(45) Date of Patent: Oct. 3, 2017

(54) CAMERA IMAGE DISPLAY SYSTEM OF AUDIO VIDEO NAVIGATION

(71) Applicant: HYUNDAI MOTOR COMPANY, Seoul (KR)

(72) Inventors: Yang Ho Ryu, Yongin-si (KR); Byeong Yeol Ryu, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/566,235

(22) Filed: Dec. 10, 2014

(65) Prior Publication Data

US 2016/0086300 A1    Mar. 24, 2016

(30) Foreign Application Priority Data

Sep. 23, 2014  (KR) .................. 10-2014-0126648

(51) Int. Cl.
*G06T 1/20* (2006.01)
*G06F 9/44* (2006.01)

(52) U.S. Cl.
CPC .............. *G06T 1/20* (2013.01); *G06F 9/4401* (2013.01)

(58) Field of Classification Search
CPC .............. G01C 21/3667; G06F 3/0488; H04N 21/4344
See application file for complete search history.

(56) References Cited

U.S. PATENT DOCUMENTS

| 2004/0085327 | A1* | 5/2004 | Jones ................... G09B 29/02 345/591 |
| 2008/0077786 | A1 | 3/2008 | Pierce et al. |
| 2011/0164062 | A1* | 7/2011 | Nakamura ......... G01C 21/3664 345/660 |
| 2013/0054951 | A1* | 2/2013 | Liu ........................ G06F 9/441 713/2 |
| 2015/0110134 | A1* | 4/2015 | Kozica ............. H04N 21/44004 370/516 |
| 2015/0350518 | A1* | 12/2015 | Lin .................... H04N 21/4222 725/110 |

(Continued)

FOREIGN PATENT DOCUMENTS

| ID | WO 2015150871 A1 * | 4/2014 | ............. G06F 13/38 |
| JP | 2008-293321 A | 12/2008 | |

(Continued)

OTHER PUBLICATIONS

Author: Nakabachi Yoshiki, Title: Information Processor; Date: Apr. 12, 2008; Japan patent publication: 2008-293321; Machine translated.*

(Continued)

*Primary Examiner* — Kee M Tung
*Assistant Examiner* — Yanna Wu
(74) *Attorney, Agent, or Firm* — McDermott Will & Emery LLP

(57) ABSTRACT

A camera image display system of audio video navigation (AVN) includes a central processing unit (CPU) configured to control an AVN system. A camera only graphical driver is configured at a kernel stage for an initial booting of the CPU to process a camera image. A display is configured to display the camera image output from the CPU. When the central processing unit is booted, the camera only graphical driver is simultaneously booted with a kernel.

4 Claims, 2 Drawing Sheets

(56) References Cited

U.S. PATENT DOCUMENTS

2015/0353012 A1* 12/2015 Hwang ..................... B60R 1/00
348/118

FOREIGN PATENT DOCUMENTS

| | | |
|---|---|---|
| JP | 2008-308076 A | 12/2008 |
| KR | 10-0870463 B1 | 11/2008 |
| KR | 10-2010-0116768 A | 11/2010 |
| KR | 10-2012-0017116 A | 2/2012 |
| KR | 10-2012-0019871 A | 3/2012 |
| KR | 10-2013-0064168 A | 6/2013 |
| KR | 10-2013-0095142 A | 8/2013 |

OTHER PUBLICATIONS

Howard Shane, The Webcam Howto, archived on Mar. 9, 2010, http://tldp.org/HOWTO/html_single/Webcam-HOWTO.*
English translation of Korean application KR10-2014-0070371, Inventor: Hwang, Appication date: Dec. 10, 2014.*

* cited by examiner

CAMERA IMAGE DISPLAY SYSTEM OF AUDIO VIDEO NAVIGATION

CROSS-REFERENCE TO RELATED APPLICATION

This application claims under 35 U.S.C. §119(a) the benefit of priority to Korean Patent Application No. 10-2014-0126648 filed on Sep. 23, 2014, the entire contents of which are incorporated herein by reference.

TECHNICAL FIELD

The present disclosure relates to a camera image display system of audio video navigation (AVN). More particularly, the present disclosure relates to a camera image display system of AVN capable of preventing a black screen from occurring due to camera image conversion and improving image display performance.

BACKGROUND

An audio video navigation (AVN) system, which is equipped in a vehicle, is a multimedia system in which a head unit, an audio unit, a video unit, a telematics unit including navigation, and the like are integrated into one unit and provides user convenience to intensively operate various multimedia devices.

The AVN system displays images of all directions of the vehicle on a front seat monitor (AVN monitor) of the vehicle through a camera to improve driving convenience and safety of the vehicle.

Generally, the AVN system requires considerable time at the time of initial booting of a graphical driver since the graphical driver performing image processing in a central processing unit (CPU) of the head unit is involved with displaying processes from a compressed moving image to a navigation image.

Therefore, the related art uses separate devices for processing the camera image before the booting is completed so as to display the camera image within a short period of time (about 2 seconds) at the time of entering a back gear during booting of the AVN system.

In detail, the head unit of the AVN system according to the related art processes the camera image using an external integrated circuit (IC) or a camera only graphical IC when booting the system and converts an external image, which is processed by the external IC, into an internal image by image switching when the booting process ends and the booting of an internal graphical driver is completed and processes the converted image.

However, the following problems are caused due to the existing imaging processing.

1. After the booting of the system is completed, if the image displayed on the monitor is converted into the processing image of the central processing unit of the head unit in the processing image of the camera only graphical IC by image switching, a black screen occurs at the time of the image conversion to make it difficult to secure a rear view of the vehicle, such that a driver may unconsciously step on a brake while the vehicle is reversing, thereby causing a sudden braking phenomenon.

2. A difference in an image quality occurs on a graphical screen between the camera only graphical IC and the central processing unit of the head unit to cause an unnecessary deterioration in image quality.

3. Separate devices (camera only graphical IC, memory, image switch, and the like) for processing the camera image are used before the booting of the system is completed, thereby causing an increase in cost.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with prior art and to provide a camera image display system of AVN capable of preventing an occurrence of a black screen due to image conversion and improving image display performance between before and after booting of an internal graphical driver is completed, at the time of booting an AVN system.

According to an exemplary embodiment of the present inventive concept, a camera image display system of AVN includes a central processing unit (CPU) configured to control an AVN system. A camera only graphical driver is configured to be booted at a kernel stage of an initial booting of the central processing unit to process a camera image. A display is configured to display the camera image output from the central processing unit. When the central processing unit is booted, the camera only graphical driver is simultaneously booted with a kernel.

The central processing unit may include a graphical user interface (GUI) and output only the camera image processed by the camera only graphical driver to the display before booting of the GUI is completed when a reverse signal is inputted after the camera only graphical driver is booted, and output the GUI image to the display while the GUI image overlays the camera image processed by the camera only graphical driver when the booting of the GUI (drawing the GUI image while the GUI image overlays the camera image by a camera application which may perform a seamless handover function at the time of booting) is completed.

The camera only graphical driver may process a camera signal received from a video decoder which decodes the camera image generated by a vehicle camera and transmit the processing camera signal to the GUI.

The camera image display system of AVN according to the exemplary embodiment of the present inventive concept has the following advantages as compared with the related art.

1. It is possible to remove separate components to process the camera image before the booting of the internal graphical driver is completed, at the time of booting the AVN system, thereby saving cost and improving reliability due to the removal of the unnecessary components.

2. It is possible to remove the unnecessary image pass of the camera image before the booting of the internal graphical driver is completed, at the time of booting the AVN system, thereby maintaining and further optimizing image quality of all the videos. That is, it is possible to prevent a black screen from occurring due to the image conversion and improve the image display performance between before and after the booting of the internal graphical driver is completed, at the time of booting the AVN system.

3. It is possible to resolve the driver's anxiety while the vehicle is reversing by preventing the black screen from occurring at the time of the camera image switching.

4. It is possible to implement a seamless handover function which naturally adds a graphical user interface (GUI)

button image to the camera image without trembling or blinking of a screen when the GUI button image overlays the camera image after the booting of the internal graphical driver is completed, thereby improving the image quality.

5. It is possible to satisfy related regulations by displaying the image of a rear camera even before the booting of the internal graphical driver is completed, at the time of booting the system.

Other aspects and embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present inventive concept will now be described in detail with reference to a certain exemplary embodiment thereof illustrated in the accompanying drawings which are given hereinbelow by way of illustration only, and thus are not limitative of the present inventive concept.

Figure 1:
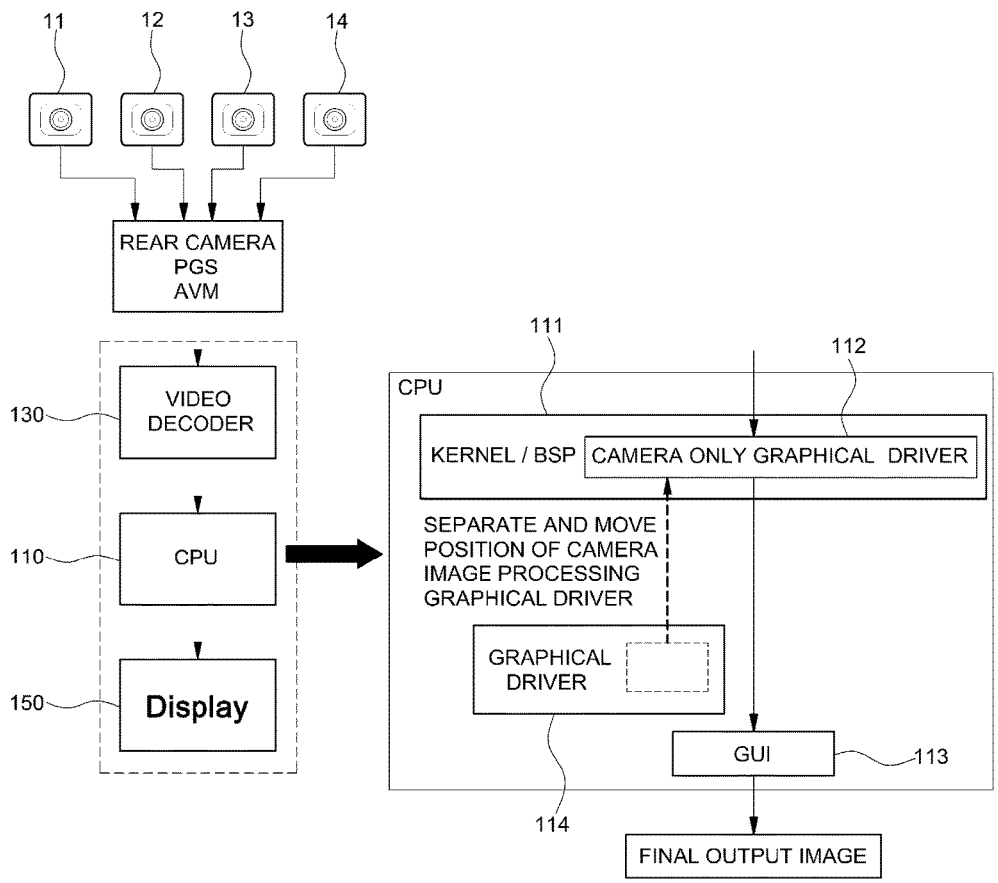
FIG. 1 is a configuration diagram schematically illustrating a camera image display system of audio video navigation (AVN) according to an exemplary embodiment of the present inventive concept.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described to be easily practiced by those skilled in the art.

The present disclosure relates to a camera image display system of audio video navigation (AVN) capable of displaying situations around a vehicle on a front seat monitor equipped inside the vehicle through an image of a camera. More particularly, the present disclosure relates to displaying a camera image when initially booting a head unit for an AVN system to prevent a black screen from occurring due to image conversion between before and after booting of an internal graphical driver is completed and to improve a camera operation speed, thereby increasing image display performance.

As illustrated in FIG. 1, the camera image display system of AVN according to the exemplary embodiment of the present front seat monitor allows a central processing unit (CPU) 110 to transmit a camera signal received by a video decoder 130 to a display 150 so as to display the camera image.

The video decoder 130 receives and decodes the camera images generated from several cameras which are attached to front and rear sides and left and right sides of the vehicle, and transmits the decoded camera images (that is, camera signals) to the CPU 110.

In this case, as the camera images generated by the cameras, at least one of a rear camera image, a parking guide system (PGS) image, an around view monitor (AVM) image, and the like is selected and used.

The CPU 110 is equipped in a head unit of the AVN system to control the overall AVN system to control and adjust a series of receiving and processing various inputs and then outputting processed results. A kernel 111, a camera only graphical driver 112, a graphical user interface (GUI) 113, and the like, which are configured in the central processing unit 110 at the time of booting for performing the operations, are sequentially booted.

The kernel 111 is an initial booting item which is booted subsequently to a basic input/output system (BIOS) which is an operating system at the time of booting the central processing unit 110, and the camera only graphical driver 112 is integrally configured in the kernel 111 to be disposed at a kernel stage which is an initial stage of the booting.

The camera only graphical driver 112 processes only the camera image and is simultaneously booted with the kernel 111 such that an image pass portion and a scaler portion for displaying the camera image are independently configured in an integrated graphical driver 114, which manages the image processing, and then slimmed at the kernel stage of the central processing unit 110.

Therefore, the central processing unit 110 may first support an output of the camera image at an initial booting time.

For reference, the integrated graphical driver in the central processing unit according to the related art manages the processing of all images such as a camera image, a navigation image, a compressed moving picture, and an external input image of the vehicle which are displayed on the display (for example, a front seat monitor inside the vehicle), but herein, the integrated graphical driver 114 serves to process remaining images (navigation image, compressed moving image, external input image, and the like) other than the camera image which is processed by the separately configured camera only graphical driver 112.

For example, the camera only graphical driver 112 performs the image processing on the camera signal received by the video decoder 130 based on a low voltage differential signaling (LVDS) scheme and transmits the image processed camera signal to the display 150.

The camera only graphical driver 112 is booted within a short period of time (for example, about 2 seconds) when the booting of the central processing unit 110 starts and waits for a reverse signal (reverse gear entry signal). Even though the central processing unit 110 is not completely booted, that is, even though the central processing unit 110 is currently booting, when the reverse signal of the vehicle is input, the camera only graphical driver 112 performs the image processing on the received camera signal and then directly transmits the image processed camera signal to the GUI 113.

The camera only graphical driver 112 is provided with a camera application which serves to determine (that is, determine the state of the reverse gear) whether the reverse signal is input, control the display output of the received camera signal, and the like.

In this case, when the booting of the GUI 113 is not completed, the camera only graphical driver 112 outputs the image processed camera signal (that is, camera image) to the display 150 by bypassing the GUI 113 and when the booting of the GUI 113 is completed while the display 150 outputs the camera image, the camera related GUI image is output to the display 150 without an image breakage, that is, the occurrence of the black screen so that the GUI image is overlayingly displayed (drawn) with the camera image on the display 150.

Figure 2:
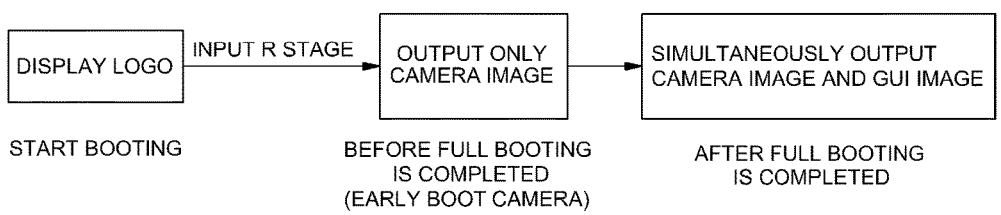
FIG. 2 is a diagram for describing an image displayed on a display during booting of a central processing unit in the camera image display system according to the exemplary embodiment of the present inventive concept.

That is, as illustrated in FIG. 2, the central processing unit 110 outputs only the camera image to the display 150 and displays only the camera image on the display 150 after the camera only graphical driver 112 is booted and before the booting of the GUI 113 is completed and outputs the GUI image together with the camera image to the display 150 after the booting of the GUI 113 is completed to make the GUI image overlay the camera image and display the overlaid image on the display 150.

Therefore, when only the camera image is displayed on the display 150 and the GUI image is displayed on the display 150 while overlaying the camera image, a seamless handover function to naturally add the GUI image (for example, GUI button image, and the like) to the camera image without screen trembling or blinking may be implemented, and the rear camera image may be displayed even before the system booting is completed (during the booting), thereby resolving the driver's anxiety.

Here, the GUI 113 produces a desktop environment in which desired operations may be performed through a graphic (image) at the time of exchanging information between a user and the central processing unit 110. For example, when the user touches a button image, and the like of the GUI image displayed on the display 150, an operation selected by the user may be recognized by the central processing unit 110.

Figure 3:
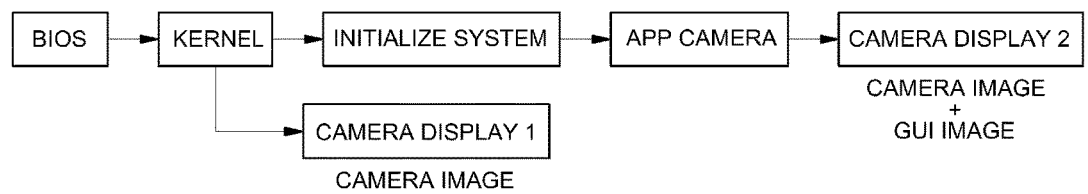
FIG. 3 is a diagram illustrating a booting process of a central processing unit in the camera image display system according to the exemplary embodiment of the present inventive concept.

As illustrated in FIG. 3, at the time of booting the central processing unit 110, the BIOS which is first booted in the booting process is booted and then the kernel 111 is booted, the camera only graphical driver 112 is booted as soon as the kernel 111 is booted, and the system is initialized by the BIOS and then the GUI 113 (or camera application of the GUI) is booted.

To output the camera image to the display 150, the related art initializes the system after the BIOS and the kernel are booted and waits until the camera application of the integrated graphical driver is booted. However, according to the exemplary embodiment of the present inventive concept, the camera only graphical driver 112 (or a camera application of the camera only graphical driver 112) is simultaneously booted with the booting of the kernel 111 to output the camera image to the display 150 immediately after the BIOS is booted (that is, even before the initialization of the system and the booting of the camera application of the GUI 113).

According to the related art, the GUI image may not be drawn on the camera image output to the display before the camera application of the integrated graphical driver is booted by simply performing a direct memory access (DMA) on a camera signal transmitted from the video decoder. Therefore, the camera image of the display disappears before the GUI image is output and the GUI image and the camera image are output to the display. In this case, the black screen occurs, and thus, the blinking occurs.

To improve the blinking, according to the exemplary embodiment of the present inventive concept, the GUI 113 is provided with the camera application which may perform the seamless handover function (making the GUI image seamlessly overlay the camera image of the display 150 simultaneously with the booting), so that when the AVN system is initialized and then the booting of the GUI 113 is completed, the GUI image may be drawn while the GUI image seamlessly overlays the camera image of the display 150.

The central processing unit 110 outputs a predetermined image such as a logo image to the display 150 after the booting thereof starts and before the reverse signal is input and outputs the logo image before the kernel 111 is booted so as to be displayed on the display 150 after the BIOS is booted and a GOP driver (performing logic to draw the logo image) is booted and before the kernel 111 is booted.

Although the embodiment of the present inventive concept is described above in detail, the protection scope of the present disclosure is not limited thereto. Therefore, various changes and improved forms by those skilled in the art using basic concepts of the present disclosure defined in the following claims belong to the protection scope of the present disclosure.

What is claimed is:

1. A camera image display system of audio video navigation (AVN), comprising:
   a central processing unit (CPU) configured to control an AVN system;
   a camera only graphical driver configured to be booted at a kernel stage of an initial booting of the CPU to process a camera image;
   an integrated graphical driver configured in the CPU to process remaining images other than the camera image which is processed by the camera only graphical driver; and
   a display configured to display the camera image output from the CPU,
   wherein the camera only graphical driver is configured in a kernel at the kernel stage which is an initial stage of the booting,
   wherein when the CPU is booted, the camera only graphical driver is simultaneously booted with the kernel,
   wherein the camera only graphical driver is configured in the kernel separately and independently from the integrated graphical driver, and
   wherein the camera only graphical driver is formed with an image pass portion and a scaler portion for displaying only the camera image, and wherein the image pass portion and the scaler portion are separated from the integrated graphical driver and then slimmed at the kernel stage of the CPU.

2. The camera image display system of AVN of claim 1, wherein the CPU includes a graphical user interface (GUI) and outputs only the camera image processed by the camera only graphical driver to the display before booting of the GUI is completed when a reverse signal is inputted after the camera only graphical driver is booted.

3. The camera image display system of AVN of claim 1, wherein the CPU includes a GUI and outputs a GUI image to the display while the GUI image overlays the camera image processed by the camera only graphical driver after booting of the GUI is completed when a reverse signal is inputted after the camera only graphical driver is booted.

4. The camera image display system of AVN of claim 1, wherein the camera only graphical driver receives a camera signal from a video decoder which decodes the camera image generated by a vehicle camera.

* * * * *